3,629,320
2-(4-HALO- AND 4-TRIFLUOROMETHYLPHENYL-
SULFONAMIDO)PHENYLACETIC ACIDS AND
ESTERS THEREOF
Jan W. F. Wasley, Ossining, N.Y., assignor to Geigy
Chemical Corporation, Greenburgh, N.Y.
No Drawing. Filed Apr. 9, 1969, Ser. No. 814,798
Int. Cl. C07c 143/78
U.S. Cl. 260—470  19 Claims

ABSTRACT OF THE DISCLOSURE 2-(4 - halo- and 4 - trifluoromethylphenylsulfonamido)
phenylacetic acids and the (lower)alkyl esters thereof are
anti-inflammatory agents. A typical embodiment is 2-(4-
chlorophenylsulfonamido)phenylacetic acid.

---

This invention pertains to a class of organic compounds
which can be diagrammatically depicted as follows:

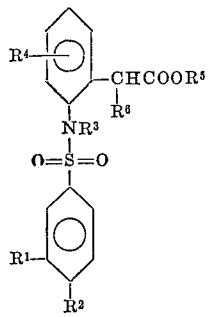

wherein
$R^1$ is hydrogen or chloro;
$R^2$ is chloro, bromo or trifluoromethyl;
$R^3$ is hydrogen, (lower)alkyl or (lower)alkanoyl,
$R^4$ is hydrogen, (lower)alkyl, (lower)alkoxy, chloro, fluoro or trifluoromethyl;
$R^5$ is hydrogen or (lower) alkyl; and
$R^6$ is hydrogen or (lower)alkyl.

This invention also pertains to the non-toxic pharmaceutically acceptable alkali metal, alkaline earth metal and organic amine salts of those compounds of Formula I wherein $R^5$ is hydrogen. Finally this invention encompasses methods and compositions utilizing a compound of Formula I or an above defined salt thereof in the treatment of inflammatory conditions.

By the term "(lower)alkyl" and derivations thereof utilizing the root "alk," such as "(lower)alkoxy," "(lower)alkanoyl" and the like, is intended, unless otherwise qualified, a group comprising a branched or straight hydrocarbon chain containing from one to six carbon atoms. Representative of (lower)alkyl groups are thus methyl, ethyl, propyl, i-propyl, butyl, s-butyl, t-butyl, pentyl, isopentyl, hexyl and the like. Embraced by lower alkoxy are groups containing from one to six carbon atoms and joined through an oxygen ether bond, such as methoxy, ethoxy, i-propoxy, butoxy and the like. It is to be understood that when the nature of any particular functional group in these moieties requires two carbon atoms, the hydrocarbon portion of the moiety will have from two to seven carbon atoms. Thus "(lower)alkanoyl" is typified by acetyl, propanoyl, butanoyl, pentanoyl, hexanoyl and the like.

The compounds of Formula I are anti-inflammatory agents and are accordingly useful in the treatment of those inflammatory conditions for which such agents are indicated. While the mechanism of action is not fully understood, it appears that the anti-inflammatory activity of these compounds may at least in part be traceable to their ability to suppress antibody formation. Thus the compounds can be shown to demonstrate activity in classical anti-inflammatory laboratory models such as the carrageenin test, the turbidity test, the Whitehouse screen and the established adjuvant arthritis assay, and at the same time also show suppression of the immunological response in the Jerne Hemolytic plaque technique.

The 2 - (4 - halo- and 4 - trifluoromethylphenylsulfonamido)phenylacetic acids and esters of Formula I are administered parenterally or orally in accordance with the present invention to achieve the described anti-inflammatory effect in any of a number of pharmaceutical forms. These include solid and liquid unit dosage forms for oral administration such as tablets, capsules, powders, suspensions, solutions, syrups and the like, including sustained release preparations, and fluid injectable forms such as sterile aqueous solutions and suspensions. The term unit dosage form as used in this specification and the claims refers to physically discrete units to be administered in single or multiple dosage to animals, each unit containing a predetermined quantity of active material in association with the required diluent, carrier or vehicle. The quantity of active material is that calculated to produce the desired anti-inflammatory effect upon administration of one or more of such units.

Powders are prepared by comminuting the compound to a suitably fine size and mixing it with a similarly comminuted diluent pharmaceutical carrier such as an edible carbohydrate material as for example, starch. A sweetening agent or flavoring oil can also be present.

Capsules are made by preparing a powder mixture as described above and filling formed gelatin sheaths. A lubricant such as talc, magnesium stearate and calcium stearate can be added to the powder mixture as an adjuvant before the filling operation.

Tablets are made by preparing a powder mixture, granulating or slugging, adding a lubricant and pressing into tablets. The powder mixture is prepared by mixing the compound, suitable comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be run through the tablet machine and the resulting imperfectly formed tablets broken into slugs. The slugs can be lubricated to prevent sticking to the tablet forming dies by means of the addition of stearic acid, a stearate salt, talc or mineral oil. The lubricating mixture is then compressed into tablets. A protective coating consisting of a sealing coat of shellac, a coating of wax can be provided. Dyestuffs can be added to these coatings to distinguish different unit dosages.

Oral fluids such as syrups and elixirs can be prepared in unit dosage form so that a given quantity, e.g., a teaspoonful, contains a predetermined amount of the compound. Syrups can be prepared by suspending or dissolving the compound in a suitably flavored aqueous sucrose solution while elixirs are prepared through the use of a non-toxic alcoholic vehicle.

For parenteral administration, fluid unit dosage forms can be prepared by suspending or dissolving a measured amount of the compound in a non-toxic liquid vehicle suitable for injection such as an aqueous or oleaginous medium. Alternatively a measured amount of the compound is placed in a vial and the vial and its contents is sterilized and sealed. An accompanying vial of vehicle can be provided for mixing prior to administration.

One important embodiment of the present invention are the non-toxic pharmaceutically acceptable salts of those compounds of Formula I wherein $R^2$ is hydrogen. Such salts include alkali metal salts such as sodium and potassium, alkaline earth metal salts such as calcium, and organic amines such as triethylamine, diethanolamine and the like.

The compounds of the present invention are prepared through the reaction of a (lower)alkyl ester of a 2-aminophenylacetic acid with an appropriate 4-chloro-, 4-bromo- or 4-trifluoromethylbenzenesulfonyl chloride, preferably in the presence of an acid acceptor such as pyridine, lutidine or the like. The resulting alkyl 2-(substituted phenylsulfonamido)phenyl acetate can then be hydrolysed as with an alkali metal hydroxide to yield the corresponding free acids. These reactions may be graphically depicted as follows:

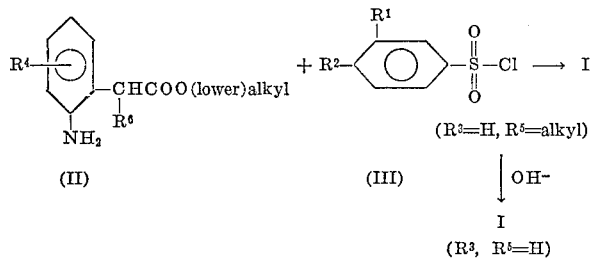

The compounds of Formula I wherein $R^3$ is (lower)-alkyl are prepared through treatment of the corresponding compound wherein $R^3$ is hydrogen with the appropriate (lower)alkyl iodide in the presence of a base such as sodium or potassium carbonate.

The compounds of Formula I wherein $R^3$ is (lower)-alkanoyl are prepared through alkanoylation with a (lower)alkanoic acid chloride.

The following examples will serve to further typify the nature of the present invention but being merely representative embodiments, these examples should not be construed as a limitation thereof.

PREPARATION

The requisite (lower)alkyl esters of the 2-aminophenylacetic acids used as starting materials may be prepared by a variety of known methods of which the following are typical.

(a) Twenty-three grams of sodium metal spheres are added with stirring at a moderate rate to 1 liter of absolute ethanol contained in a 5 liter three-necked flask equipped with stirrer, condenser and dropping funnel. Diethyl malonate (160.2 g.) is then added dropwise by means of the dropping funnel, followed by the addition of 171.6 g. of 3-nitro-4-chloro-toluene. The mixture is heated at reflux for 2.5 hours after which the ethanol is distilled off at atmospheric pressure. To the reaction flask are then added 1 liter of absolute ethanol and 1 liter of 10% potassium hydroxide and the mixture is heated at reflux for 1.5 hours, followed by distillation of the ethanol at atmospheric pressure. The solution is cooled to room temperature and extracted twice with 500 ml. of ether. The basic aqueous layer is adjusted to a pH of 1 by means of 6 N hydrochloric acid to yield a brown solid. The product is collected by filtration and dried for 18 hours at 70° C./10 mm. The 4-methyl-2-nitrophenylacetic acid melts at 167–8° C. A mixture of 17.5 g. of 4-methyl-2-nitrophenylacetic acid, 250 ml. of absolute methanol and 5 ml. of concentrated sulfuric acid is heated at reflux for 2 hours, and excess solvent is then removed by distillation. The reaction is cooled to room temperature, rendered basic with a 10% ammonium hydroxide solution, diluted with 500 ml. of water and extracted twice with 300 ml. of ether. The ether extracts are dried over magnesium sulfate, clarified, filtered, and evaporated to dryness under reduced pressure to yield methyl 4-methyl-2-nitrophenylacetate as an amber-colored oil. This oil is dissolved in 150 ml. of ethyl acetate and 1 g. of 5% palladium-on-carbon is added as catalyst. The reaction mixture is hydrogenated at atmospheric pressure until three molar equivalents of hydrogen are consumed. The catalyst is removed by filtration and the filtrate is evaporated to dryness under reduced pressure at 30–35° C., yielding methyl 2-amino-4-methylphenylacetate as an oil.

(b) To 33 g. of 5-methoxy-2-nitrophenylacetic acid [prepared according to C. F. Koelsch: J. Am. Chem. Soc. 66, 2019–20 (1944)] in 200 ml. of absolute methanol are added 5 ml. of concentrated sulfuric acid. The mixture is heated at reflux for two hours. Excess solvent is removed by distillation, the residue is diluted with 550 ml. of water, and the solution is rendered basic with 10% ammonium hydroxide. The aqueous solution is extratced with ether (3 × 300 ml.). The ethereal extracts are clarified dried over magnesium sulfate, and the solvent evaporated under reduced pressure to yield methyl 5-methoxy-2-nitrophenylacetate; M.P. 162–164° C. A mixture is prepared by dissolving 34.1 g. of methyl 5-methoxy-2-nitrophenylacetate in 200 ml. of ethyl acetate and 3 g. of 5% palladium on barium sulfate are added as catalyst. The mixture is hydrogenated at atmospheric pressure at 20° C., until three molar equivalents of hydrogen have been consumed. The catalyst is removed by filtration and the filtrate is evaporated to dryness under reduced pressure to yield methyl 5-methoxy-2-aminophenylacetate as an oil.

(c) A mixture of 10 g. of 5-fluoro-2-nitrophenylacetonitrile and 75 ml. of concentrated hydrochloric acid is heated at reflux for 90 minutes. The reaction mixture is poured into 300 ml. of cold water with stirring whereupon the 5-fluoro-2-nitrophenylacetic acid precipitates. The solid is collected by filtration and is dried in vacuo to yield 5-fluoro-2-nitrophenylacetic acid; M.P. 151–5° C. A mixture of 8.1 g. of 5-fluoro-2-nitrophenylacetic acid, 150 ml. of absolute methanol and 5 ml. of concentrated sulfuric acid is heated at reflux for two hours. Excess methanol is evaporated, the residue is diluted with 200 ml. of water, and the solution is rendered basic with a 10% ammonium hydroxide solution. The basic aqueous layer is extracted twice with 200 ml. of ether. The ethereal extracts are clarified, dried over magnesium sulfate, and the solvent evaporated under reduced pressure to yield methyl-5-fluoro-2-nitrophenylacetate as an oil. To 7.7 g. of this oil, dissolved in 200 ml. of absolute ethanol, is added 1 g. of 5% palladium on barium sulfate. The mixture is hydrogenated at atmospheric pressure and at 20° C. until three molar equivalents of hydrogen are consumed. The catalyst is removed by filtration and the filtrate is evaporated to dryness under reduced pressure to yield methyl 5-fluoro-2-aminophenylacetate as an oil.

(d) A mixture of 2-nitro-4-trifluoromethylphenylacetic acid (34 g.), absolute methanol (200 ml.) and concentrated sulfuric acid (10 ml.) is heated at reflux for two hours. The mixture is then cooled, diluted with water (750 ml.) and rendered basic with 10% ammonium hydroxide. The solid is collected by filtration and the filtrate is extracted with ether (2× 200 ml.). The combined ethereal extracts are dried over magnesium sulfate and evaporated to dryness. The residual solid is combined with the previous crop to yield methyl 2-nitro-4-trifluoromethylphenylacetate, M.P. 96–99° which can be used without further purification or characterization. Fourteen grams of this material in ethanol (400 ml.) is hydrogenated at atmospheric pressure and room temperature using 5% palladium-on-barium sulfate (3.5 g.) as catalyst. After 3 mole equivalents (3.4 l.) of hydrogen are absorbed, the catalyst is separated by filtration and the solvent evaporated to dryness under reduced pressure to yield methyl 2 - amino - 4 - trifluoromethylphenylacetate, M.P. 76–77°.

(e) A solution of o-nitro-α-methylphenylacetic acid (80 g.) in absolute methanol (500 ml.) and concentrated sulfuric acid (5 ml.) is heated at reflux for two hours. Upon cooling, the reaction mixture is rendered basic with 10% ammonium hydroxide, diluted with water to eight times the original volume and extracted with ether. The ethereal extracts are dried over sodium sulfate and the solvent evaporated under reduced pressure to yield methyl 2-nitro- α-methylphenylacetate which is then distilled, B.P. 107–114°/0.04–0.5 mm. Two and a half grams of this material is dissolved in ethyl acetate (100 ml.) and hydrogenated at atmospheric pressure using 5% palladium-on-barium sulfate (1 g.) as catalyst. After removal of the catalyst, the solution is dried over magnesium sulfate and the solvent evaporated under reduced pressure to yield methyl 2-amino-α-methyl-phenylacetate.

EXAMPLE 1

2-(4-chlorophenylsulfonamido)phenylacetic acid (A) Methyl 2-(4-chlorophenylsulfonamido)phenylacetate.—Methyl 2-aminophenylacetate (16.5 g., 0.1 mole) dissolved in dry pyridine (70 ml.) and cooled to 10° C. 4-chlorobenzenesulfonyl chloride (21.1 g., 0.1 mole) is added in small portions, the temperature of the reaction being maintained below 20° C. Upon completion of the addition, the reaction is stirred at room temperature for 30 minutes. Water (400 ml.) is then added to the reaction, together with solid sodium bicarbonate until the evolution of carbon dioxide ceases. The reaction mixture is extracted with ether (2× 200 ml.). The combined ethereal extracts are washed with 0.1 N hydrochloric acid (3× 300 ml.), clarified, dried over magnesium sulfate and evaporated under reduced pressure. The residual oil crystallizes upon standing for several hours to yield the desired ester which may be recrystallized from ethanol, M.P. 90–91° C.

(B) 2 - (4 - chlorophenylsulfonamido)phenylacetic acid.—Methyl 2-(4-chlorophenylsulfonamido)phenylacetate (30.3 g.) and 0.18 N sodium hydroxide (1 l.) are combined and heated at reflux until a homogeneous solution is obtained. The aqueous solution is clarified, filtered, cooled and rendered acidic with 3 N hydrochloric acid. The solid is collected and recrystallized from aqueous ethanol to yield the product, M.P. 135–136° C.

EXAMPLE 2

2-(3,4-dichlorophenylsulfonamido)phenylacetic acid

By substituting 25 g. of 3,4-dichlorobenzenesulfonyl chloride for 4-chlorobenzenesulfonyl chloride in part (A) of Example 1, and completing the procedure therein described, there is obtained methyl 2-(3,4-dichlorophenylsulfonamido)phenylacetate. This, upon hydrolysis according to the procedure of part (B) of Example 1 yields 2 - (3,4 - dichlorophenylsulfonamido)phenylacetic acid, M.P. 172–174° C.

EXAMPLE 3

N-methyl 2-(3,4-dichlorophenylsulfonamido)-phenylacetic acid (A) Methyl 2 - (3,4-dichlorophenylsulfonamido)phenylacetate (2.8 g.); acetone (30 ml.), anhydrous potassium carbonate (2.49 g.) and methyl iodide (4.36 g.) are heated at reflux for 18 hours. The reaction is then cooled to room temperature and the solid removed by filtration. The filtrate is concentrated under reduced pressure to yield methyl N-methyl - 2 - (3,4-dichlorophenylsulfonamido)-phenylacetate as a yellow solid.

(B) N - methyl - 2 - (3,4-dichlorophenylsulfonamido)phenylacetic acid.—Methyl N-methyl - 2 - (3,4-dichlorophenylsulfonamidophenylacetate) (31 g., 0.080 mole), is dissolved in hot methanol (100 ml.). To this hot methanolic solution is added 0.5 N NaOH (200 mls., 0.10 mole). The mixture heated on the steam bath until all the methanol has evaporated. The solution is then cooled to room temperature, filtered and rendered acidic with 3 N HCl to yield a solid which is collected and dissolved in ether. The ethereal solution is filtered and clarified to yield a colorless solution which is concentrated under reduced pressure. The solid thus formed is collected by filtration and washed well with ether to yield the desired compound, M.P. 153–153.5° C.

EXAMPLE 4

2-(4-chlorophenylsulfonamido)-4-trifluoromethylphenylacetic acid

By utilizing an equivalent amount of methyl 2-amino-4 - trifluoromethylphenylacetate in place of methyl 2-aminophenylacetate and following substantially the procedure of Example 1, there is obtained methyl 2-(4-chlorophenylsulfonamido) - 4 - trifluoromethylphenylacetate which upon hydrolysis yields the corresponding free acid, M.P. 195–196° C.

Similarly, if in addition an equivalent amount of 3,4-dichlorobenzenesulfonyl chloride is employed in place of 4 - chlorobenzenesulfonyl chloride, in substantially the same procedure, then there is obtained methyl 2-(3,4-dichlorophenylsulfonamido) - 4 - trifluoromethylphenylacetate which then hydrolysed according to part (B) yields 2-(3,4-dichlorophenylsulfonamido) - 4 - trifluoromethylphenylacetic acid, M.P. 208–209° C.

In an analogous fashion, utilization of the alkyl esters of other substituted 2-aminophenylacetic acids with the appropriately substituted benzenesulfonyl chloride yields the correspondingly substituted 2-phenylsulfonamidophenylacetates and -acetic acids. For example, methyl 2-amino-5-methoxyphenylacetate (8.4 g.) is dissolved in dry pyridine (100 mls.) and 3,4-dichlorobenzenesulfonyl chloride (10.6 g.) is added in moderate portions with stirring. The mixture is stirred for 15 hours and water (250 mls.) is then added. The oil which separates is extracted with ether (2× 250 mls.) and these extracts are washed with 5% sodium bicarbonate solution (2× 100 mls.) and water (10× 200 mls.), dried over magnesium sulfate, clarified, filtered and evaporated under reduced pressure to yield methyl 2 - (3,4-dichlorophenylsulfonamido)phenylacetate. This is hydrolysed in the manner previously described to yield 2-(3,4-dichlorophenylsulfonamido)-5-methoxyphenylacetic acid, M.P. 176–178° C.

EXAMPLE 5

Methyl N-acetyl-2-(4-chlorophenylsulfonamido)phenylacetate

Methyl 2-(4 - chlorophenylsulfonamido)phenylacetate (16 g., 0.05 mole) is dissolved in pyridine (100 ml.) and acetyl chloride (7.9 g., 0.10 mole) is added in a dropwise fashion to the stirring solution. The reaction mixture is heated at 80° C. for 30 minutes and then cooled to room temperature and diluted with 2 N hydrochloric acid (500 ml.). The mixture is stored in a freezer for 15 hours and the aqueous layer is then decanted. The residual oil crystallizes as colorless needles and is recrystallized from aqueous ethanol, M.P. 85–6° C.

Utilization of other (lower)alkanoic acid chlorides yields the corresponding N-alkanoyl compounds.

EXAMPLE 6

α-Methyl 2-(3,4-dichlorophenylsulfonamido)-phenylacetic acid

Methyl α-methyl - 2 - aminophenylacetate (17.9 g., 0.1 mole) is dissolved in dry pyridine (70 ml.) and cooled to 10° C. 3,4-dichlorobenzenesulfonyl chloride (24.5 g., 0.1 mole) is added in small portions, the temperature of the reaction being maintained below 20° C. Upon completion of the addition, the reaction is allowed to stir at room temperature over night. Water (400 ml.) is then added to the mixture, together with saturated sodium bicarbonate solution until the evolution of carbon dioxide ceases. The reaction mixture is extracted with ether (2× 200 ml.). The combined ethereal extracts are washed with 0.1 N hydrochloric acid (3× 300 ml.) and then with water (5× 200 ml.), clarified dried over magnesium sulfate and evaporated under reduced pressure to yield methyl α-methyl 2-(3,4-dichlorophenylsulfonamido)phenylacetate as an oil.

Methyl α-methyl 2-(3,4-dichlorophenylsulfonamido)-phenylacetate (36 g., 0.093 mole), 0.1 N sodium hydroxide (1 liter, 0.1 mole) and ethanol (200 ml.) are combined and heated at reflux for 2 hours. The ethanol is removed by distillation and the aqueous solution is clarified, filtered, cooled and rendered acidic with 3 N hydrochloric acid. The solid is collected and recrystallized from ethanol to yield the product, M.P. 184–5° C.

EXAMPLE 7

2-(4-trifluoromethylphenylsulfonamido)phenylacetic acid

Methyl 2-aminophenylacetate (16.5 g., 0.1 mole) is dissolved in dry pyridine (70 ml.) and cooled to 10° C. p-Trifluoromethylbenzenesulfonyl chloride (24.5, 0.1 mole) is added in small batches, the temperature of the reaction being maintained below 20° C. Upon completion of the addition, the reaction mixture is stirred at room tempertaure for 30 minutes. Water (400 ml.) is then added to the reaction mixture together with solid sodium bicarbonate until carbondioxide ceases to evolve. The reaction mixture is extracted with ether (2× 200 ml.) and the combined ethereal extracts are washed with 0.1 N hydrochloric acid (3× 300 ml.), clarified, dried and evaporated under reduced pressure to yield methyl 2-(4-trifluoromethylsulfonamido)phenylacetate. Thirty grams of this material and one liter of 0.2 N sodium hydroxide are heated at reflux until a homogeneous solution is obtained. The solution is clarified, filtered, cooled and rendered acidic with 3 N hydrochloric acid. The solid which forms is collected and recrystallized from aqueous ethanol.

EXAMPLE 8

2-(4-bromophenylsulfonamido)phenylacetic acid

Methyl o-aminophenylacetate (19.7 g., 0.113 mole) is dissolved in reagent grade pyridine (125 mls.). 4-bromobenzenesulfonyl chloride (28.8 g., 0.113 mole) is then added to the stirring pyridine solution and the mixture stirred at room temperature for fifteen hours. The solution is then diluted with 5% sodium bicarbonate solution (250 mls.) and extracted with diethyl ether (2× 200 mls.). The combined ethereal extracts are washed with 5% sodium bicarbonate solution (2× 100 mls.) and water (6× 100 mls.), clarified, dried over magnesium sulfate and filtered, and evaporated to dryness in vacuo to yield methyl 2-(4-bromophenylsulfonamido)phenylacetate. Fifty grams of this material and 600 ml. of 0.25 N sodium hydroxide are warmed at steam bath temperatures until a homogeneous solution is obtained. The solution is clarified, filtered, cooled to room temperature and treated with 2 N hydrochloric acid to pH 1. The acidic aqueous layer is decanted, and the residual solid is washed with water (2× 100 mls.). The solid is recrystallized from aqueous ethanol to yield the product, M.P. 165–166° C.

EXAMPLE 9

2-(4-chlorophenylsulfonamido)-4-methylphenylacetic acid

Methyl-2-amino-4-methylphenylacetate (4.6 g., 0.025 mole) is dissolved in pyridine (150 mls.) and 4-chlorobenzenesulfonyl chloride (5.3 g., 0.025 mole) is added. Upon completion of addition, the reaction mixture is stirred at room temperature for 15 hours. The mixture is then diluted with 5% sodium bicarbonate solution (200 mls.) and extracted with ether (2× 300 mls.). The ethereal extracts are washed with 5% sodium bicarbonate (2× 100 mls.) and water (6× 150 mls.), clarified, filtered, dried over magnesium sulfate and evaporated to dryness under reduced pressure to yield methyl 2-(4-chlorophenylsulfonamido)-4-methylphenylacetate as an oil which solidifies upon standing. This material (6.3 g., 0.019 mole) in absolute methanol (25 mls.) is treated with 0.1 N sodium hydroxide solution (250 mls., 0.025 mole) at refluxing temperatures for 2½ hours. The methanol is removed by distillation and the aqueous residue is clarified, filtered and rendered acidic with 6 N hydrochloric acid to pH 1 to yield the product which is recrystallized from aqueous ethanol, M.P. 148–149° C.

In a similar fashion utilizing methyl 2-amino-5-fluorophenylacetate, there is obtained 2-(4-chlorophenylsulfonamido)-5-fluorophenylacetic acid, M.P. 186–187° C.

EXAMPLE 10

α-Methyl-2-(4-chlorophenylsulfonamido)phenylacetic acid

Methyl α-methyl-o-aminophenylacetate (4.7 g., 0.027 mole) is dissolved in reagent grade pyridine (60 mls.). 4-chlorobenzenesulfonyl chloride (5.6 g., 0.027 mole) is added to the stirring solution and the mixture is stirred at room temperature for 15 hours. The mixture is diluted with 5% sodium bicarbonate solution (300 mls.) and extracted with ether (2× 250 mls.). The combined ethereal extracts are washed with 5% sodium bicarbonate (2× 150 mls.) and water (7× 200 mls.), clarified, dried over magnesium sulfate, filtered and evaporated to yield methyl α-methyl-2-(4-chlorophenylsulfonamido)phenylacetate as an oil. Four grams of this material and 100 ml. of 0.2 N sodium hydroxide are combined. Ethanol is added until a clear solution is obtained. This mixture is heated under reflux for two hours. The ethanol is removed by distillation and the residual aqueous layer is clarified, filtered and treated with 6 N hydrochloric acid to pH 1. The residual oil is extracted with ether, dried over magnesium sulfate and evaporated to dryness to yield the oil which is dissolved in methanol (25 mls.). A solution of sodium bicarbonate (0.85 g.) in water (10 ml.) is added and the resulting solution is evaporated to dryness under reduced pressure to yield the product as the sodium salt, which after recrystallization from methanol/ether, softens at 147° C. and decomposes at 160–170° C.

What is claimed is:

1. A compound of the formula:

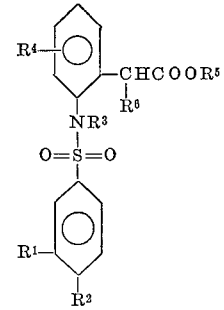

wherein $R^1$ is hydrogen or chloro;
$R^2$ is chloro, bromo or trifluoromethyl;
$R^3$ is hydrogen, (lower)alkyl or (lower)alkanoyl;
$R^4$ is hydrogen, (lower)alkyl, (lower)alkoxy, chloro, fluoro, or trifluoromethyl;
$R^5$ is hydrogen or (lower)alkyl; and
$R^6$ is hydrogen or (lower)alkyl and when $R^5$ is hydrogen, pharmaceutically acceptable salts with bases.

2. A compound according to claim 1 wherein $R^5$ is (lower)alkyl.

3. A compound according to claim 1 wherein $R^5$ is hydrogen.

4. The non-toxic pharmaceutically acceptable salts with bases of a compound according to claim 3.

5. A compound according to claim 1 wherein each of $R^3$, $R^4$ and $R^6$ is hydrogen and $R^2$ is chloro.

6. The compound according to claim 1 which is 2-(4-chlorophenylsulfonamido) phenylacetic acid.

7. The compound according to claim 1 which is 2-(3,4-dichlorophenylsulfonamido) phenylacetic acid.

8. The compound according to claim 1 which is N-methyl-2-(3,4-dichlorophenylsulfonamido) phenylacetic acid.

9. The compound according to claim 1 which is 2-(4-chlorophenylsulfonamido) - 4 - trifluoromethylphenylacetic acid.

10. The compound according to claim 1 which is 2-(3,4-dichlorophenylsulfonamido) - 4 - trifluoromethylphenylacetic acid.

11. The compound according to claim 1 which is 2-(3,4-dichlorophenylsulfonamido) - 5 - methoxyphenylacetic acid.

12. The compound according to claim 1 which is methyl 2-(4-chlorophenylsulfonamido)phenylacetate.

13. The compound according to claim 1 which is methyl N - acetyl-2-(4-chlorophenylsulfonamido)phenylacetate.

14. The compound according to claim 1 which is α-methyl 2 - (3,4-dichlorophenylsulfonamido)phenylacetic acid.

15. The compound according to claim 1 which is α-methyl 2-(4-chlorophenylsulfonamido)phenylacetic acid.

16. The compound according to claim 1 which is 2-(4-trifluoromethylphenylsulfonamido)phenylacetic acid.

17. The compound according to claim 1 which is 2-(4-bromophenylsulfonamido)phenylacetic acid.

18. The compound according to claim 1 which is 2-(4-chlorophenylsulfonamido)-4-methylphenylacetic acid.

19. The compound according to claim 1 which is 2-(4-chlorophenylsulfonamido)-5-fluorophenylacetic acid.

References Cited

UNITED STATES PATENTS 3,162,684   12/1964   Frick et al. _____ 260—518 UX

JAMES A. PATTEN, Primary Examiner

J. F. TERAPANE, Assistant Examiner

U.S. Cl. X.R.

260—470, 471, 501.12, 515, 518, 519, 521; 424—309, 316, 319